Patented Aug. 29, 1933

1,924,601

UNITED STATES PATENT OFFICE 1,924,601

COMPOSITE STRUCTURE

Harry C. Fisher, Norwood, Ohio, assignor to The Richardson Company, Lockland, Ohio, a corporation of Ohio No Drawing. Application May 25, 1929
Serial No. 366,104

5 Claims. (Cl. 154—51)

My invention has to do with the manufacture of an improved composite structure suitable for a number of uses such as tiles for wall or roof coverings, card table tops, mirror and picture frames, chair seats and backs, etc.

It has been proposed, as in a copending application, Serial No. 354,711, filed Apr. 12, 1929, by Edward R. Dillehay, to form a molded compound such as a composition of bituminous material and fibrous material, the molded structure having upon at least that surface which shall be exposed in use, a coating of a hardened phenolic or other condensation resin such for example as bakelite. An object of the present invention is to make improvements in structures of this general class as will hereinafter be more fully explained, and further to simplify and cheapen the method of manufacture thereof. My invention is not however, restricted to the manufacture of flat or comparatively flat articles such as tiles, but is adapted to the manufacture of a large number of articles including but without limitation, vessels and other complex molded shapes.

It is one of the objects of my invention to provide a tile or other structure having great body resilience and body toughness, combined with a thin surfacing of hardened condensation resin. The natural resilience of very thin layers of condensation resin is comparatively great and when such layers are joined with a body composition of great resilience, an article is formed which is not liable to cracking and breaking.

It is still another object of my invention to provide a structure which may be light in weight while having great strength and toughness and which at the same time will be unaffected by acids and moisture.

In an aspect of my invention not restricted to tiles and the like, one of my objects is to produce an article which is characterized by different qualities than those obtainable in articles molded from a charge of plastic dough.

It is still a further object of my invention to facilitate the making of articles of the class described by the use of a preformed base article, not liable to the difficulties in handling presented by hot, premolded, plastic compositions.

These and other objects of my invention I attain by that series of process steps and in that article of which I shall now describe a preferred embodiment, which is a tile for interior decoration, it being understood that my invention is not restricted thereto.

Broadly in the practice of my invention, I form a layer (or a series of laminations forming a layer) of a fibrous composition possessing the characteristics of having been felted upon a screen, and I coat this layer with a condensation resin, heat curing it in place thereon.

I may in practicing my invention use felted webs which have been saturated with a heat plastic substance to which the condensation resin will bond during the process of heat curing and molding. But I prefer to use sheets of the felted product of bituminous pulps as hereinafter described because such felted sheets not only have the characteristics of a saturated web but also have the characteristics of a truly heat plastic composition in that they may readily be deformed and caused to flow under heat and pressure. My copending application Serial No. 314,551, filed Oct. 23, 1928 and the copending application of Earl P. Stevenson and Harry A. Buron Serial No. 316,611 filed Nov. 1, 1928, both teach methods of producing a pulp suitable for felting upon a screen, in which pulp there is held in stable association, a heat plastic substance existing in minute uncoated particles. This type of pulp I call a "bituminous pulp" to distinguish it from pulps of fibrous material alone or from pulps in which a heat plastic substance exists in an emulsified state or in some state of comparatively unstable dispersion. My invention is not restricted to the use of the felted products of bituminous pulps, but is equally adapted to the use of the felted products of other pulps having waterproofing, heat plastic or bituminous substances therein, to felted webs which have been saturated with such binder substances, and even to unsaturated webs.

In an exemplary embodiment of my invention, bituminous pulps formed in accordance with the copending applications above referred to may be run onto a paper making machine of the Fourdrinier, the multi-cylinder, or any other suitable type, and there felted into sheets which will be pressed between rolls as is the usual practice, and conducted over drying cylinders which are steam heated. The action of the drying cylinders will be to dry the sheet and melt the bitumen therein. The final product is a felted substance, which if the percentage of bitumen is large, say approximately 60% by weight of asphalt to 40% by weight of fibrous material will partake of the nature both of a saturated felted web and also a plastic fibrous composition in that, when it has been softened sufficiently by heat, it may be caused to flow under pressure and to be molded into shapes which may be comparatively complex. It will be very tough and strong and will hold its shape under heat like a plastic article comprising the same ingredients in the same proportions. The proportions given above may be varied at will, the only requirement being that sufficient binder be present to permit plastic flow under pressure and heat.

It has been proposed to manufacture molded articles by coating sheets of this substance with bitumen, assembling the sheets in heated molds and molding an article therefrom. It has also been proposed to manufacture tubular articles by winding plies of the felted substance about a mandrel, and to manufacture articles by first forming a tubular structure of such plies and then deforming the tube under heat and pressure into a new shape. I may, if I desire, proceed in accordance with the teachings of any of these applications to form an initial article which I shall later coat at least in part with a layer of hardened condensation resin. I need not however, proceed by any of these processes. In the manufacture of tiles, I may start with a single sheet of felted composition or I may start with a single sheet of felted substance formed from other pulps than that which has been referred to as a bituminous pulp above; or I may start with felted webs which have been saturated with heat plastic substances. I may further start with laminated pieces of such substances, or preformed or semipreformed shapes made in molds, or otherwise.

For example, asphalt paper of .027 caliper can be made on a multi-cylinder paper machine with a formula of 60% 10 pen. Stanolite asphalt, 20% kraft papers, and 20% mixed papers. Several of these papers can be assembled in a mold with a small amount of asphalt such as 25 penetration air-blown Mexican as an adhesive between plies and upon the application of pressure preferably with a moderate degree of heat, say 110° F., a laminated article very solid and stiff will be produced. After removing the plunger from the mold, powdered bakelite can be sprinkled over the article in the mold and the pressure again applied for four minutes with a temperature of 235° F., whereupon, after cooling the mold sufficiently, a laminated article consisting of several plies of asphalt paper combined with adhesive asphalt and coated with one layer of hardened, colored, polished condensation resin is obtained.

In any event, my invention comprises the taking of a unitary or laminated piece of felted substance containing a heat plastic agent, the coating of such a piece with an uncured phenolic or other condensation resin, and the molding of the two substances together under heat sufficient and sufficiently prolonged first to melt the condensation resin and then to harden and cure it in place upon the surface of the article.

Condensation resins are conveniently obtainable in the form of molding powders. These molding powders will adhere sufficiently to a piece of the felted substance which I use to serve my purposes; and when the piece is warmed the adherence is improved. A convenient practice in the manufacture of flat tiles is therefore to manufacture a sheet of the requisite thickness from a single layer or several layers of the felted product, and then to coat this sheet with condensation resin molding powder, afterward cutting the sheet apart into shapes for the manufacture of tiles, introducing these shapes into molds and pressing them there under sufficient heat to soften and then to cure the condensation resin. A preferable procedure in some cases, may be to place a quantity of condensation resin in a mold and introduce the felted sheets above it, in other cases it may be desirable to introduce the piece of felted structure first, then cover it with powdered condensation resin. Any one of a large number of procedures are possible for bringing my preformed structures into association with the condensation resin either before or after the introduction of the substances into a mold.

The mold is preferably equipped with means both for heating and cooling it. It is a characteristic of uncured condensation resins that they will first soften and in many instances liquefy under heat. At this stage they will flow in the mold to a considerable extent, thus forming an even coating; and in many instances may be caused to flow about a mold charge so as to coat the final article over a larger area than that originally coated with the condensation product. Upon the continued application of heat however, the condensation product hardens, sets and cures so that it is not thereafter heat plastic. In the meantime the heat of the molding operation will have softened the felted structure which forms the base of the article, or will have maintained it in a somewhat softened condition if it was heated when introduced. The bond between the condensation product and the felted structure will be found to be perfect. In this way may be manufactured articles which have a body of tough resilient felted substance and a surface of hard condensation resin of any surface or color desired.

My invention is not restricted to the manufacture of flat articles as explained. I may for example build up tubes of the felted substance, coat these tubes with condensation resin and heat cure the resin in place thereon under pressure by inserting the tubes, still on mandrels, into molds. I may form of the felted structure, vessels or other complex shapes and while these are still warm coat them with molding powder, place them in a mold and press and cure them there. When my felted structure has the preferred plastic characteristics, I may start with a blank thereof and during the curing of the condensation resin, I may deform the blank itself into a new shape.

Various modifications of my invention may be made by those skilled in the art without departing from the spirit thereof. In the ensuing claims, I intend it to be understood that by the term condensation resin, I intend to include both natural resinous materials which have the required physical properties and the synthetic resins, particularly such as have an initial fusibility or plasticity when heated or exposed to heat and pressure, but which cure to an infusible and un-heat plastic condition upon the continued application of heat or heat and pressure. Such substances comprise resins made essentially by reacting upon non-resinous substances with a resinifying agent. This group includes the phenol derivative products, such as bakelite. I intend the term also to comprise resins made by reacting on natural resins with various chemical agents substantially to modify their composition. Typical of this group are metallic resinates, and ester gums. Finally, I intend the term to comprise substances which are not essentially resins but do possess plastic properties of somewhat the same characteristics, such as the various esters and compounds of cellulose. By the terms "bitumen" or "bituminous" I intend to include the various asphalts, coal tars, mineral, fatty acid and coal tar pitches, blown oils, waxes, rosin and the like.

Having thus described my invention, what I claim as new and desire to secure by Letters Patent, is:—

1. A composite structure comprising a base of a composition of bitumen and fibers felted upon a screen, and a substantial surface covering of a hardened condensation resin, sufficient to determine the appearance of said surface and substantially combined thereto so as to form an overlying layer.

2. A composite structure, formed of a plurality of layers of a composition of fiber and heat plastic substance formed by felting upon a screen and joined together by heat and pressure, and a substantial surface coating of hardened condensation resin, sufficient to determine the appearance of said surface and substantially combined thereto so as to form an overlying layer.

3. A tile comprising a fibrous body containing bitumen and having the characteristics of having been felted upon a screen, and a surfacing of hardened condensation resin joined thereto, said surface constituting substantially a separate layer.

4. A tile comprising a plurality of layers of the felted product of a bituminous pulp and a layer of hardened condensation resin, the whole joined under heat and pressure.

5. An article comprising a body of the felted product of a pulp in which fibers in water suspension have intimately associated therewith a bituminous binder in minute, uncoated particles, and a coating on said body of hardened condensation resin, said coating being substantially wholly superficial.

HARRY C. FISHER.